United States Patent
Wang et al.

(10) Patent No.: US 7,751,719 B2
(45) Date of Patent: Jul. 6, 2010

(54) ELECTRICAL GENERATION OF RETURN-TO-ZERO (RZ) DATA PATTERN WITH FLEXIBLE DUTY CYCLE ADJUSTMENT FOR OPTICAL TRANSMISSION

(75) Inventors: Li L. Wang, Fremont, CA (US); Song Q. Shang, Palo Alto, CA (US)

(73) Assignee: Intel Corporation, Santa Clara, CA (US)

( * ) Notice: Subject to any disclaimer, the term of this patent is extended or adjusted under 35 U.S.C. 154(b) by 372 days.

(21) Appl. No.: 11/731,727

(22) Filed: Mar. 30, 2007

(65) Prior Publication Data

US 2008/0240728 A1    Oct. 2, 2008

(51) Int. Cl.
*H04B 10/12* (2006.01)

(52) U.S. Cl. .................. 398/155; 398/154; 398/182
(58) Field of Classification Search ............... 398/154, 398/155, 161, 182, 192–194, 199; 375/363
See application file for complete search history.

(56) References Cited

U.S. PATENT DOCUMENTS 3,774,178 A * 11/1973 Curtis ..................... 360/43
4,025,720 A * 5/1977 Pachynski, Jr. ............ 375/363
4,791,407 A * 12/1988 Prucnal et al. .............. 341/68

* cited by examiner

*Primary Examiner*—Dalzid Singh
(74) *Attorney, Agent, or Firm*—Kevin A. Reif

(57) ABSTRACT

An electrical return to zero (RZ) encoder converts non-return to zero (NRZ) data, into of RZ data patterns with a flexibility for duty cycle adjustment so that any RZ data pattern may be provided for a specific application's need. A duty cycle of>50% or<50% may be achieved by selecting between a clock signal or its complement and adjusting its delay.

14 Claims, 2 Drawing Sheets

ELECTRICAL GENERATION OF RETURN-TO-ZERO (RZ) DATA PATTERN WITH FLEXIBLE DUTY CYCLE ADJUSTMENT FOR OPTICAL TRANSMISSION

FIELD OF THE INVENTION

Embodiments of the invention relate to optical communications and, more particularly, to generation of return to zero (RZ) data pattern from a non-return to zero (NRZ) data pattern.

BACKGROUND INFORMATION

Optical data transmission may be coded in different formats. Two commonly used formats are either a return-to-zero signaling scheme or a non-return-to-zero signaling scheme. Return-to-zero (RZ) signaling refers to a signaling scheme in which the signal returns to zero between each pulse. The signal returns-to-zero between pulses even if a number of consecutive zeros or ones occur in the signal. Since the signal returns to zero between each pulse, a separate clock signal is, typically, not needed in the RZ signaling scheme.

Non-return-to-zero (NRZ) refers to a signaling scheme in which logic highs are represented by one significant condition and logic lows are represented by another significant condition with no neutral or rest condition. Since the pulses do not have a rest state, a synchronization signal is typically sent alongside the data signal.

For optical transmission, the data with return-to-zero (RZ) format provides more margins to the required optical signal-to-noise ratio (OSNR) and polarization-mode-dispersion (PMD) tolerance. The duty cycle of the RZ pulse has a direct impact on the transmission performance. At present, the RZ pulse shaping or duty cycle adjustment is realized in the optical domain by use of an additional Mach-Zahnder modulator (MZM).

MZM RZ conversion involves generating the RZ data pattern by implementing two optical modulators in optical domain. The first optical modulator is driven at twice of the data rate by a sinusoidal signal, and the resulting optical output signal is RZ optical pulse trains at 50% duty cycle.

The output RZ pulse train is then input to the second optical modulator which is driven by an NRZ data encoded electrical signal. The resulting output is optical RZ data pattern at 50% duty cycle. The second optical modulator is often called a carver since it actually encodes the data. To generate RZ signals at 33% or 67% duty cycles, the first optical modulator has to be driven at half of the data frequency by utilizing the characteristics of optical MZM.

In this conventional approach, two optical modulators along with two drivers are used, which is very expensive considering the cost of the second MZM and its driving electronics. The addition insertion loss from the second MZM and the lager form factors are the other disadvantages of the optical RZ encoders.

DETAILED DESCRIPTION

Embodiments are directed to an electrical return to zero (RZ) encoder which converts non-return to zero (NRZ) data into of RZ data patterns with a flexibility for duty cycle adjustment so that any RZ data pattern is provided for specific application's need. The output of the encoder is not only limited to RZ format. Both RZ and NRZ data may be chosen.

Figure 1:
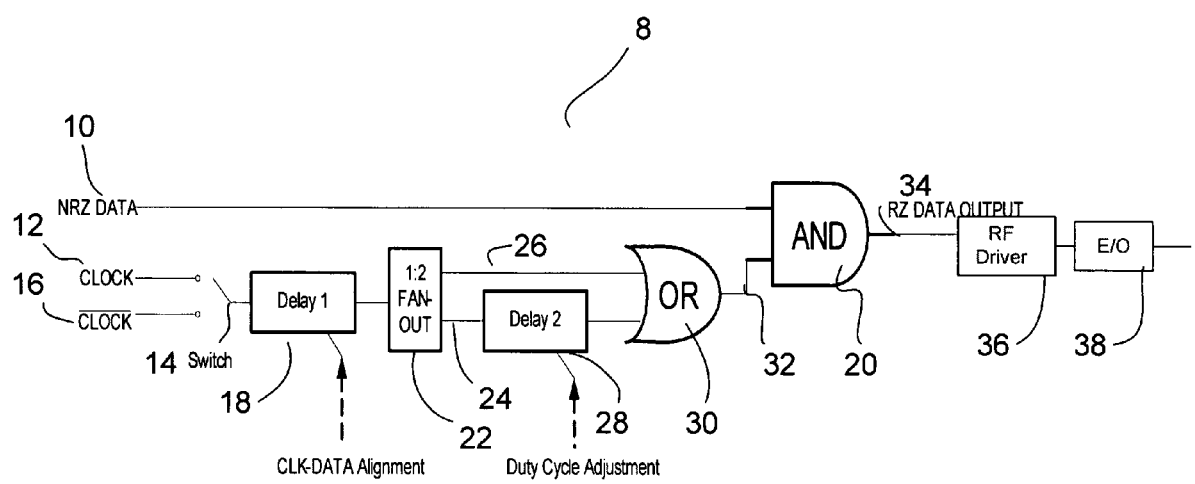
FIG. 1 is a block diagram of one embodiment of a flexible NRZ to RZ encoder.

Referring to FIG. 1, there is shown a block diagram of one embodiment of a flexible RZ encoder 8. A NRZ data 10 and its serial clock 12 are fed into the encoder 8. A high-speed switch 14 may be used to select either a normal clock 12 or its complementary clock signal 16. A first delay (delay 1) 18 may be used to generate overall delay for the clock, 12 or 16, so that the clock and the NRZ data 10 can be aligned at the input of the AND gate 20. After delay-1 18, a fan-out (or split) 22 may split the clock into two identical signals 24 and 26.

The first split clock signal 24 may be delayed by (delay 2) 28 before the OR-gate 30 where it is logically ORed with the second split clock signal 26. The output of OR-gate 30 is a serial clock 32 whose duty cycle has been modified depending on the relative delay set by delay-2 28 between two input clocks. Finally this clock 32 having a variable duty cycle is ANDed at AND-gate 20 with the NRZ data 10. The output of the AND-gate 20 is RZ data converted from the NRZ data input 10. The duty cycle of the RZ data 34 can be adjustable by changing the time of delay-2 28 of one of the clock signal going into the OR gate 30. Thus the RZ data pattern 34 has a flexible duty cycle with the delay adjustment from delay-2 28.

Figure 2:
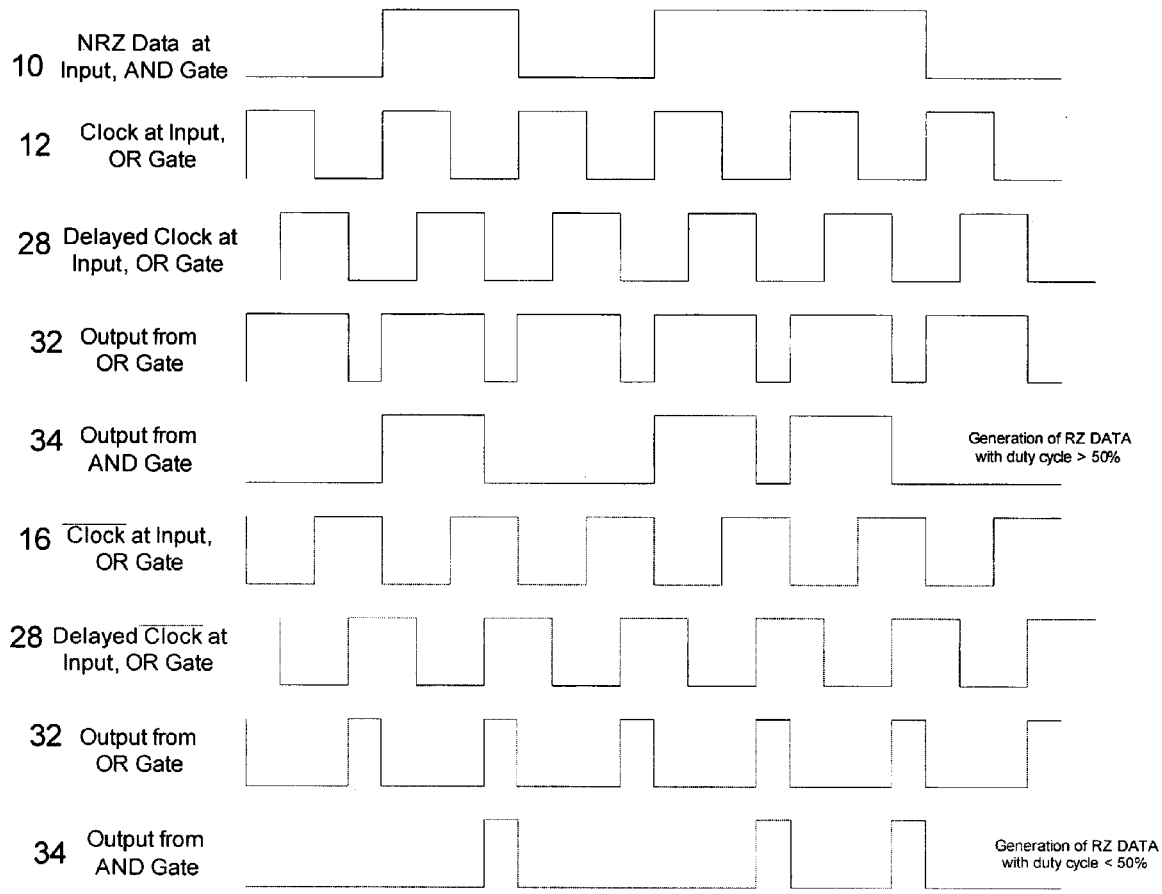
FIG. 2 is a data and clock timing diagram showing NRZ data converted to RZ data with a flexible duty cycle.

FIG. 2 is a timing diagram that shows the detailed time sequences of data and clocks and how a RZ data pattern with different duty cycle may be generated from initial NRZ data. FIG. 2, taken with FIG. 1 shows a non-return to zero NRZ data pattern 10 is input to the AND-gate 20. In order to get a converted return to zero (RZ) data pattern with duty cycle<50%, the normal clock 12 is selected with switch 14. As shown in the timing diagram delay-2 28 is selected to delaying the clock 26. The output 32 of the OR-Gate 30 will be high when either the clock 12 is high or the delayed clock 28 is high. When the OR-gate output 32 is high and the original NRZ data 10 is high the resultant AND-gate 20 output is the NRZ data 10 converted to an RZ data pattern 34 with a duty cycle that can be adjusted between 1-50% simply by changing value in delay-2 28.

An RZ data pattern with duty cycle>50% can be generated by using the complementary clock 16. Under this configuration, the duty cycle can be adjusted between 50-100% by changing delay-2 28. Just as before, non-return to zero NRZ data pattern 10 is input to the AND-gate 20. In order to get a converted return to zero (RZ) data pattern with duty cycle>50%, the complimentary clock 16 is selected with switch 14. As shown in the timing diagram delay-2 28 is selected to delaying the clock 16. The output 32 of the OR-Gate 30 will be high when either the clock 26 is high or the delayed clock 28 is high. When the OR-gate output 32 is high and the original NRZ data 10 is high the resultant AND-gate 20 output is the NRZ data 10 converted to an RZ data pattern 34 with a duty cycle that can be adjusted between 50-100% simply by changing value in delay-2 28.

Once the desired electrical RZ data pattern is generated, the output 34 of RZ encoder is ready to be amplified by a RF driver 36 so that the required voltage and current can be provided for a generic electric-to-optical converter (E/O) 38. The electric-to-optical converter 38 can be, but not to be limited to, a directly modulated laser (DML), electron absorptive modulator (EA) or a Mach-Zehnder modulator (MZM). Embodiments may be used for a variety of applications as a method to improve OSNR and PMD tolerance. It is also a flexible device to enable both NRZ and RZ data formats for optical transmission in a simple way.

Embodiments described herein have many advantages including low component cost, simplicity in implementation and flexibility, a compact design for low power consumption and low optical insertion loss.

The above description of illustrated embodiments of the invention; including what is described in the Abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize.

These modifications can be made to the invention in light of the above detailed description. The terms used in the following claims should not be construed to limit the invention to the specific embodiments disclosed in the specification and the claims. Rather, the scope of the invention is to be determined entirely by the following claims, which are to be construed in accordance with established doctrines of claim interpretation.

What is claimed is:

1. An encoder to convert a non-return to zero (NRZ) data signal to a return to zero (RZ) data signal, comprising:
   an input to receive a non-return to zero (NRZ) data signal;
   a first delay to align a clock signal with the NRZ data signal;
   a splitter to split the clock signal into a first clock signal and a second clock signal;
   a second delay to delay the first clock signal;
   an OR-gate to logically OR the delayed first clock signal and the second clock signal; and
   an AND-gate to logically AND the NRZ data signal and the output of the OR-gate, wherein the output of the AND-gate is a return to zero (RZ) data signal.

2. The encoder as recited in claim 1 wherein the RZ data signal comprises a duty cycle between 1-50% adjusted by the second delay.

3. The encoder as recited in claim 1 further comprising a switch prior to the first delay to select a complimentary clock signal.

4. The encoder as recited in claim 3 wherein the RZ data signal comprises a duty cycle between 50-100% adjusted by the second delay.

5. The encoder as recited in claim 1 further comprising:
   a radio frequency (RF) driver to receive the RZ data signal.

6. The encoder as recited in claim 5 further comprising:
   a electric-to-optical converter connected to the RF driver.

7. A method for converting a non-return to zero (NRZ) data signal to a return to zero (RZ) data signal, comprising:
   delaying a clock signal;
   logically ORing the clock signal and the delayed clock signal to output an ORed signal;
   logically ANDing a non-return to zero (NRZ) data signal with the ORed signal; and
   outputting a return to zero (RZ) data signal.

8. The method as recited in claim 7 further comprising:
   changing the duty cycle of the RZ data signal from between 1-50% by adjusting the delay of the clock signal.

9. The method as recited in claim 7 wherein the clock signal comprises a complementary clock signal.

10. The method as recited in claim 9 further comprising:
    changing the duty cycle of the RZ data signal from between 50-100% by adjusting the delay of the complementary clock signal.

11. The method as recited in claim 7 further comprising:
    aligning the clock signal to the data signal.

12. The method as recited in claim 7 further comprising;
    switching between the clock signal and a complementary clock signal.

13. The method as recited in claim 7 further comprising:
    amplifying the RZ data signal.

14. The method as recited in claim 13 further comprising:
    converting the RZ data signal to an optical signal.

* * * * *